(12) United States Patent
Hedderich

(10) Patent No.: US 7,593,685 B1
(45) Date of Patent: Sep. 22, 2009

(54) OPTICAL MARK RECOGNITION TABULATION DEVICE

(75) Inventor: Richard C. Hedderich, Sandy, UT (US)

(73) Assignee: Zip-Scan, Inc., Salt Lake City, UT (US)

( * ) Notice: Subject to any disclaimer, the term of this patent is extended or adjusted under 35 U.S.C. 154(b) by 472 days.

(21) Appl. No.: 11/422,426

(22) Filed: Jun. 6, 2006

(51) Int. Cl.
*G09B 3/00* (2006.01)
(52) U.S. Cl. ...................................... 434/353
(58) Field of Classification Search ................. 434/353, 434/354, 355, 357, 363; 235/454; 271/3.14, 271/3.15, 8.1, 9.06
See application file for complete search history.

(56) References Cited

U.S. PATENT DOCUMENTS

| | | | | |
|---|---|---|---|---|
| 3,412,484 A | * | 11/1968 | Evans et al. | 434/355 |
| 3,460,827 A | * | 8/1969 | Dostel et al. | 271/259 |
| 3,574,263 A | * | 4/1971 | Del Elia | 434/355 |
| 3,601,906 A | * | 8/1971 | Roche | 434/355 |
| 3,721,807 A | * | 3/1973 | Miller et al. | 434/355 |
| 3,722,111 A | * | 3/1973 | Georges | 434/355 |
| 3,737,625 A | * | 6/1973 | Azure, Jr. | 434/355 |
| 3,793,472 A | * | 2/1974 | Sternberg et al. | 434/363 |
| 5,085,587 A | * | 2/1992 | DesForges et al. | 434/355 |
| 5,184,003 A | * | 2/1993 | McMillin et al. | 235/454 |
| 5,399,845 A | * | 3/1995 | Manucy, III | 235/454 |
| 5,870,831 A | * | 2/1999 | Wagner | 33/494 |

* cited by examiner

*Primary Examiner*—Kurt Fernstrom
(74) *Attorney, Agent, or Firm*—Workman Nydegger

(57) ABSTRACT

An optical mark recognition tabulation device includes a guide channel including opposing integral sidewalls configured to laterally constrain a test sheet as the test sheet is fed past a set of optical sensors. The optical sensors are aligned with optical entry indicia on the test sheet to sense marks on the optical entry indicia as the test sheet is fed past the optical sensors. The optical mark recognition tabulation device further includes a recessed channel located along at least a substantial portion of a side of the guide channel. The optical mark recognition tabulation device further includes a spacer strip configured to be received within the recessed channel and effectively reduce the width of the guide channel such that the guide channel is reconfigured to laterally constrain a different size of test sheet when the spacer strip is received within the recessed channel.

18 Claims, 8 Drawing Sheets

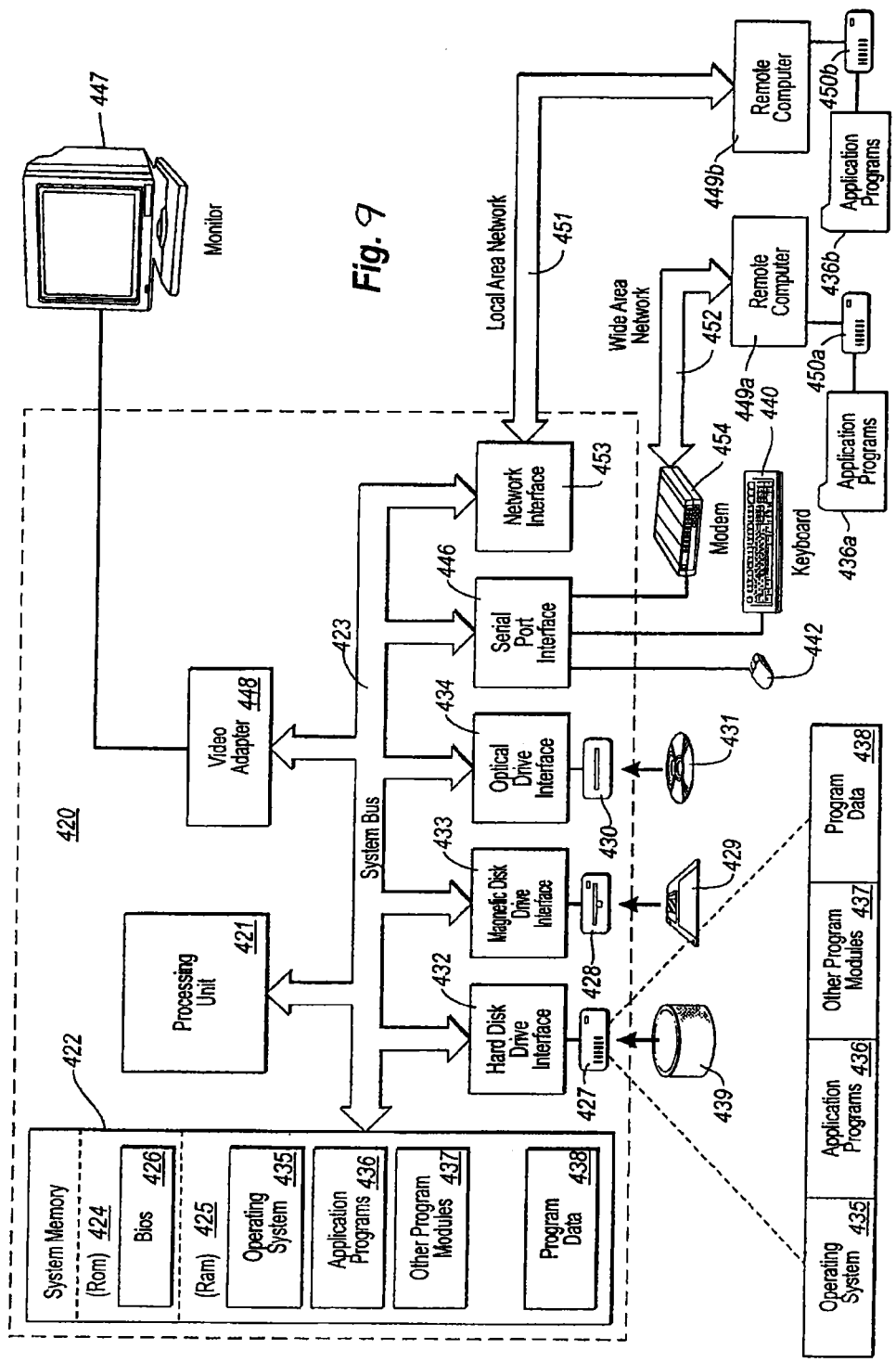

OPTICAL MARK RECOGNITION TABULATION DEVICE

BACKGROUND

Optical mark recognition tabulation devices find use in many industries and applications. One particular application where optical mark recognition tabulation devices have become of particular use is in the multiple-choice testing and survey industries. Several companies make and sell exam answer sheets and associated optical mark recognition devices to grade them.

Conventionally, optical mark recognition devices receive a sheet having some form of a multiple choice type "fill-in-the-circle/square/rectangle" answer sheet. The answer sheet is defined by varying length and width, from single column 50 answer tests to multiple column forms having hundreds of entry indicia for entry of test answers. The forms are sensed optically, using optical emitters and sensors to detect markings in each test answer location typically using a reflective arrangement. In reflective configurations, the emitter reflects electromagnetic radiation off of the test sheet and the reflected electromagnetic radiation is received by the optical sensors to sense optical marks on the test sheet. The optical mark recognition tabulation devices can be configured to tabulate and automatically grade results.

Typically, however, a reproduced testing sheet will not work in conventional embodiments. For example, the ink of the original becomes too dark once reproduced and prevents such copying. Thus, companies have retained the ability to require customers to buy testing forms from the company as well as the optical mark recognition tabulation device. As such, companies that manufacture optical mark recognition tabulation devices have been able to control the market for both the devices and the paper testing sheets.

In addition, conventional optical mark recognition tabulation devices have used mechanical sheet feeding devices, such as rollers and other moving parts, to feed testing sheets past an optical mark reading head including arrays of optical emitters and optical sensors. These mechanical sheet feeding devices introduce additional electronics, motors, and moving parts that result in additional cost and reduced reliability.

Conventional optical mark recognition tabulation devices may also require testing sheets of a single size and design or of a non-standard paper size. As a result of this constraint, as well as those discussed above, consumers are again required to buy testing sheets from the manufacturer. Moreover, creation of customized testing sheets must involve the manufacturer as well, which may introduce delay and additional cost.

Therefore, what would be advantageous are optical mark recognition tabulation devices with improved versatility for accepting different sizes of testing forms, reduced cost, increased reliability, and/or compatibility with consumer produced, or reproduced, testing sheets.

BRIEF SUMMARY OF SEVERAL EXAMPLE EMBODIMENTS

An optical mark recognition tabulation device is disclosed. The optical mark recognition tabulation device includes a guide channel including opposing integral sidewalls configured to laterally constrain a test sheet as the test sheet is fed past a set of optical sensors. The optical sensors are aligned with optical entry indicia on the test sheet to sense marks on the optical entry indicia as the test sheet is fed past the optical sensors. The optical mark recognition tabulation device further includes a recessed channel located along at least a substantial portion of a side of the guide channel. The optical mark recognition tabulation device further includes a spacer strip configured to be received within the recessed channel. The spacer strip has a width that effectively reduces the width of the guide channel such that the guide channel is reconfigured to laterally constrain a different size of test sheet when the spacer strip is received within the recessed channel.

A spacer strip is disclosed. The spacer strip is configured to be received within a guide channel of an optical mark recognition tabulation device. The spacer strip has a width that is about ½ the difference between a letter sheet of paper and an A4 sheet of paper. The spacer strip also has a length that laterally constrains a test sheet along a substantial length of the guide channel.

These and other features of the present invention will become more fully (apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 9 illustrates a suitable computing environment that can be coupled to the optical mark recognition tabulation devices or used to create customized compatible testing sheets.

DETAILED DESCRIPTION OF SEVERAL EMBODIMENTS

The principles of the embodiments described herein describe the structure and operation of several examples used to illustrate the present invention. It should be understood that the drawings are diagrammatic and schematic representations of such example embodiments and, accordingly, are not limiting of the scope of the present invention, nor are the drawings necessarily drawn to scale. Well-known devices and processes have been excluded so as not to obscure the discussion in details that would be known to one of ordinary skill in the art.

Figure 1:
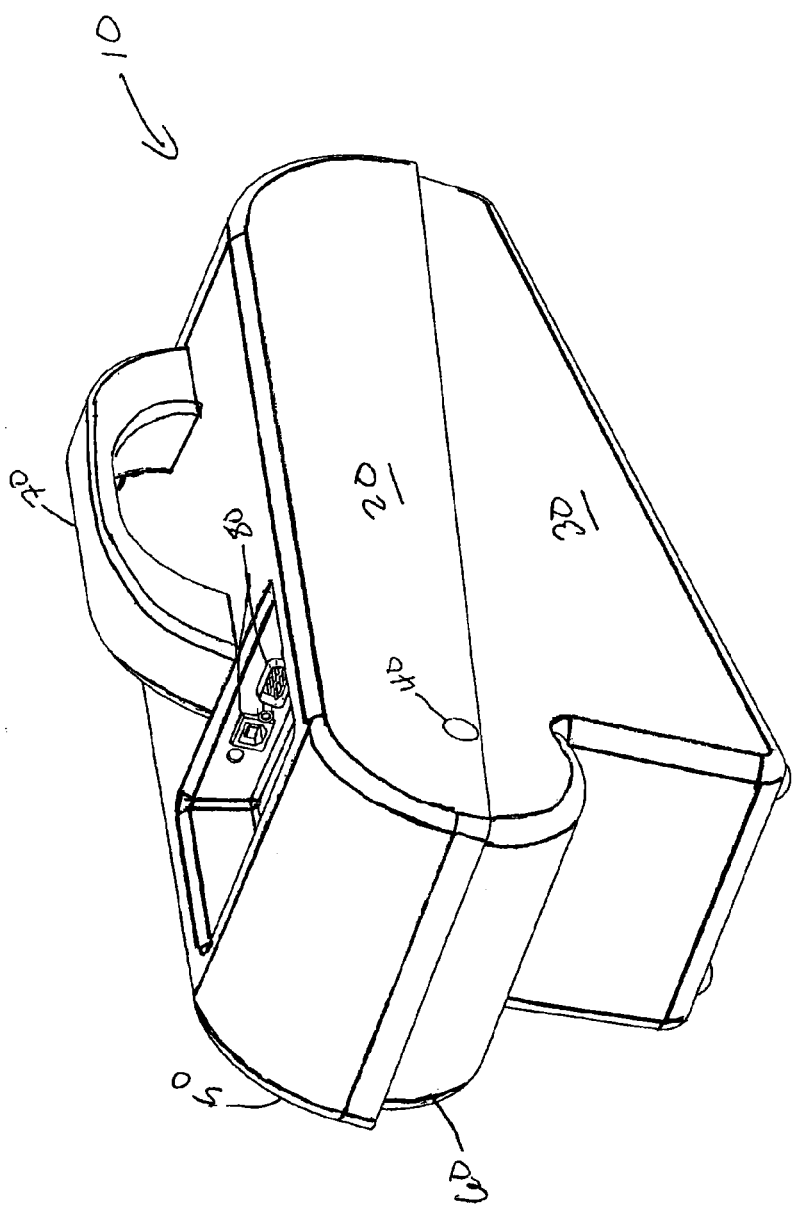
FIG. 1 illustrates a front isometric view of an optical mark recognition tabulation device.

Referring to FIG. 1, a front isometric view of an optical mark recognition tabulation device 10 is illustrated according to an example embodiment. The optical mark recognition tabulation device 10 is illustrated in a closed position where a top portion 20 and a bottom portion 30 are in a substantially parallel configuration. The top portion 20 is pivotally coupled to the bottom portion 30 by a pivot 40. An end 50 of the top portion 20 approximate to the pivot 40 has a radius for pivoting about a respective end 60 of the bottom portion 30 that also includes a radius. The top portion 20 includes a handle 70 for facilitating transportation of the optical mark recognition tabulation device 10. The top portion 20 also includes ports 80 for electrically coupling internal circuitry with a computer to communicate data describing optical entries to testing indicia on test sheets. The two port 80 examples illustrated in FIG. 1, are a universal serial bus (USB) port and a serial port, such as a standard 9 pin RS232 serial port. The optical mark recognition tabulation device 10 can receive power from the port 80 and/or from an internal or external power source.

Figure 2:
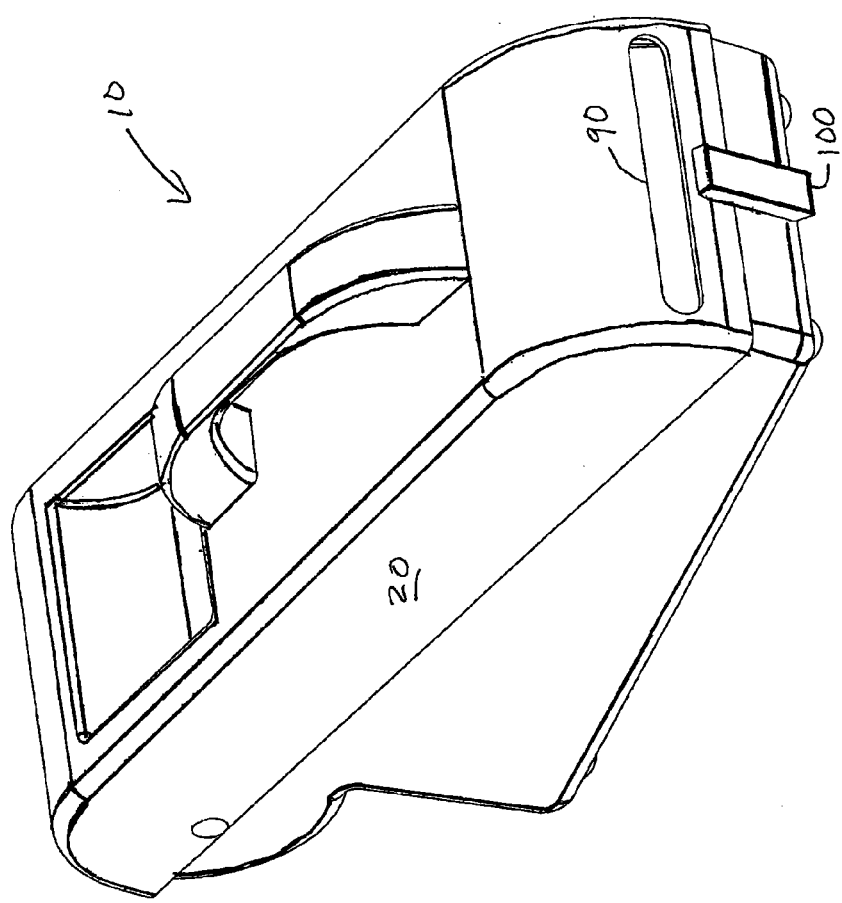
FIG. 2 illustrates an optical mark recognition tabulation device from a back isometric view.

FIG. 2 illustrates the optical mark recognition tabulation device 10 example embodiment of FIG. 1 from a back isometric view. As illustrated, the optical mark recognition tabulation device 10 is in a closed position. The top portion 20 includes an opening 90 for receiving test sheets and guiding the test sheets to an internal guide channel. The optical mark recognition tabulation device 10 further includes a latch 100. The latch 100 is an example of a closure device for securing the optical mark recognition tabulation device 10 in a closed position illustrated in FIGS. 1 and 2.

Figure 3:
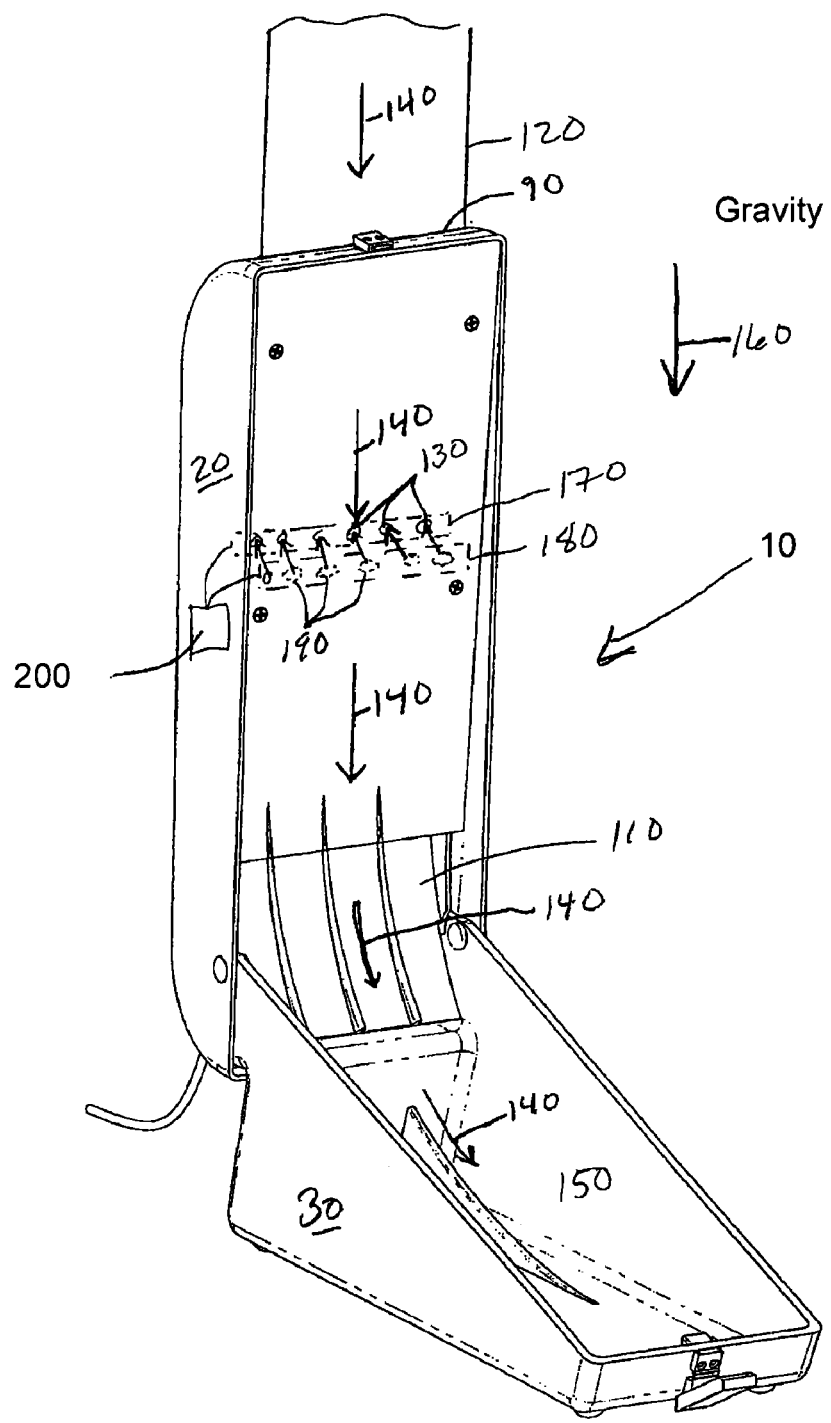
FIG. 3 illustrates an optical mark recognition tabulation device from a rear isometric view in an open configuration.

Referring to FIG. 3, the optical mark recognition tabulation device 10 is illustrated in a rear isometric view in an open configuration where the top portion 20 is in a substantially perpendicular position (or about 90 degrees) to the bottom portion 30. As shown, the top portion 20 includes a paper guide platform 110 that guides a testing sheet 120 received within the opening 90 past several optical sensors 130, along a feed path 140 including a substantially 90 degree transition, and into a receptacle 150 of the bottom portion 30. In the open position, the top portion 20 is substantially parallel to the force of gravity 160 such that the force of gravity 160 feeds test sheet 120 along the feed path 140, past the optical sensors 130, and into the receptacle 150 of the bottom portion 30 without requiring mechanical sheet feeding components.

Figure 4:
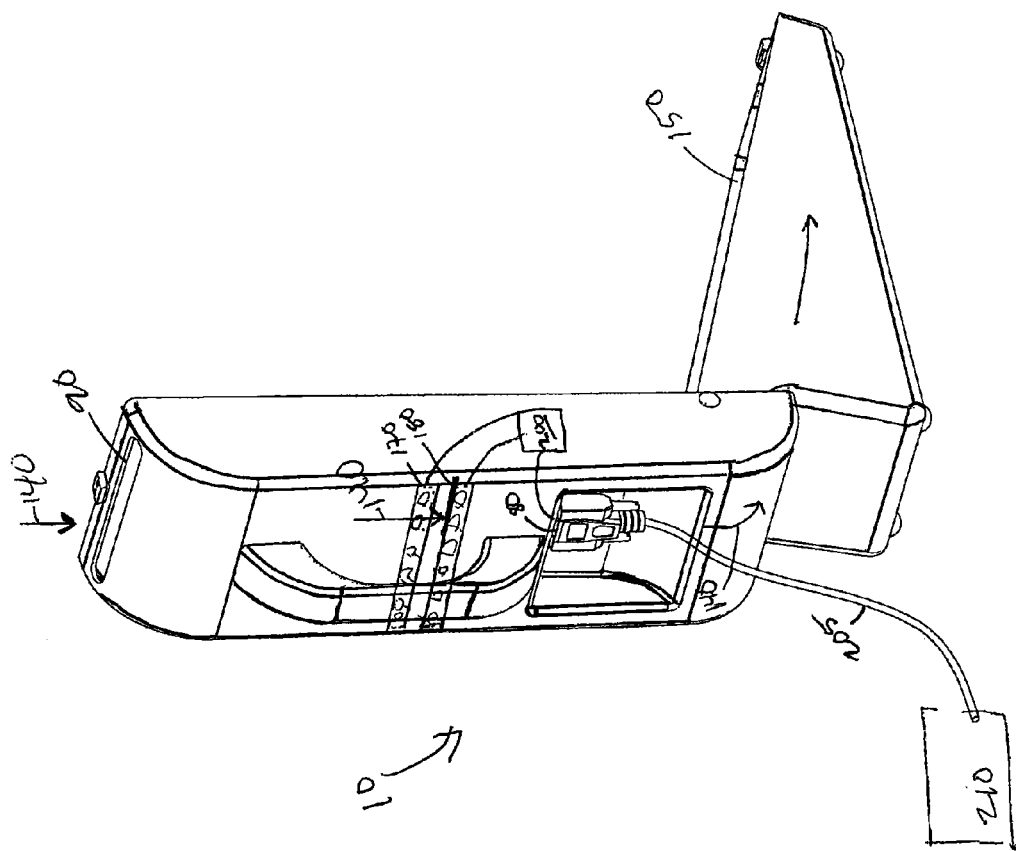
FIG. 4 illustrates an optical mark recognition tabulation device from a front open isometric view.

As illustrated in FIG. 3, the test sheet 120 is fed along the feed path 140 and between an array 170 of optical sensors 130 and an array 180 of optical emitters 190. Any number of optical emitters 190 and sensors 130 can be implemented. The optical sensors 130 and emitters 190 can be located on opposite sides of the guide channel as illustrated such that the test sheet 120 is fed along the feed path 140 between the optical sensors 130 and respective optical emitters 190. The optical emitters 190 can emit infrared electromagnetic radiation that is transferred through the test sheet 120 and is received by a respective one of the optical sensors 130 in the absence of a mark on the test sheet. Circuitry 200 receives data from the optical sensors 130 and communicates data describing test answers sensed to the ports 80 (see FIG. 1). FIG. 4 illustrates the optical mark recognition tabulation device 10 from a front open isometric view. As illustrated test sheets are received within the opening 90 and are fed along feed path 140 and into receptacle 150. The test sheets are fed between the opposing optical emitter array 180 and sensor array 170. The emitter array 180 and sensor array 170 are electrically coupled to circuitry that is electrically coupled to the port 80 which is coupled to a computer 210 or other data processing device via a cable 205.

It should be appreciated that different types of optical emitters 190 and configurations of elements can be implemented. However, the configuration and combination of elements illustrated in FIGS. 1-4 have been found to provide several advantages. For example, as discussed above many conventional optical mark recognition devices use a reflective optical arrangement where the emitter reflects electromagnetic radiation off of a test sheet. The reflected electromagnetic radiation is received by a respective optically coupled optical sensor. However, reflective embodiments may detrimentally rely on several assumptions. For example, because reflective embodiments rely on an angle of reflection from the surface of the test sheet to optically couple the optical emitter and sensor, a highly controlled distance between the test sheet and the optical emitter and sensor must be maintained. Otherwise the reflected portion of the electromagnetic radiation may not be received by the sensor or may cause detrimental interference with other optical sensors. Moreover, the test sheet must be substantially flat because deviations in the surface angle of the test sheet can likewise reflect the electromagnetic radiation in a direction away from the respective optical sensor. The misdirected reflected electromagnetic radiation may also cause interference for other optical sensors.

Thus, advantageous embodiments have been recognized where the optical emitters 190 and optical sensors 130 are located on opposing sides of a guide channel. Moreover, electromagnetic radiation has been selected in the infrared spectrum such that the electromagnetic radiation is conducted through the test sheet 120 and selectively blocked by entries to the test indicia indicating a test answer which can then be sensed and tabulated by the optical mark recognition tabulation device 10.

Such embodiments are particularly advantageous when used in conjunction with gravity fed embodiments. For example, test sheet distance and surface discontinuity may, in some instances, be less closely controlled in gravity fed embodiments as opposed to mechanically fed embodiments using rollers and other mechanical feeding devices. However, where such tolerances and conditions may cause a gravity fed optical mark recognition tabulation device to have problems it has been found that the directly opposed configuration of optical emitters and sensors such as those illustrated in FIGS. 3 and 4 have met with exceptional unexpected success.

Figure 5:
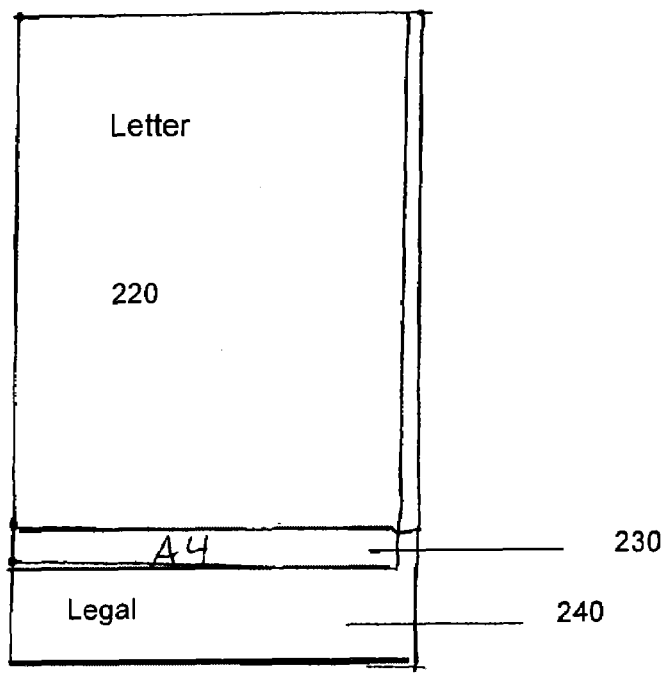
FIG. 5 illustrates examples of different standard paper sizes.

As discussed above, another drawback of conventional optical mark recognition tabulation devices discovered by the Applicants is that conventional devices use custom sized and/or non-reproducible test sheets. One aspect of several embodiments disclosed herein is the use of test sheets that are sized according to standard sized, or fractions of standard sized, paper sheets. Moreover, the test sheets are producible, or reproducible using photocopiers, printers, or other known printing means. For example, referring to FIG. 5, examples of different standard paper sizes are illustrated. More particularly, standard paper sizes of letter sized paper 220, A4 sized paper 230, and legal size paper 240 are shown.

The exact sizes of standard sized paper are well known. For example, A4 is a standard paper size, defined by the international standard ISO 216 as 210×297 mm (roughly 8.27×11.69 in). A4 is the normal size of paper for both domestic and business purposes in all countries except the United States, Canada, Mexico, the Philippines, Chile and other American countries. Current standard sizes of U.S. paper include "letter", "legal", and "ledger"/"tabloid" standard sizes. The exact dimensions of letter size paper are 8.5 inches by 11 inches, or 216 mm×279 mm. There are various additional standard paper sizes of use in the United States, Europe, and other countries. Thus, where an optical mark recognition tabulation device is designed to accommodate reproduced test sheets that can be generated by conventional printing devices in various countries and in various industries, there is a need to accommodate different sizes of standard paper sizes in a simple and efficient manner.

Figure 6:
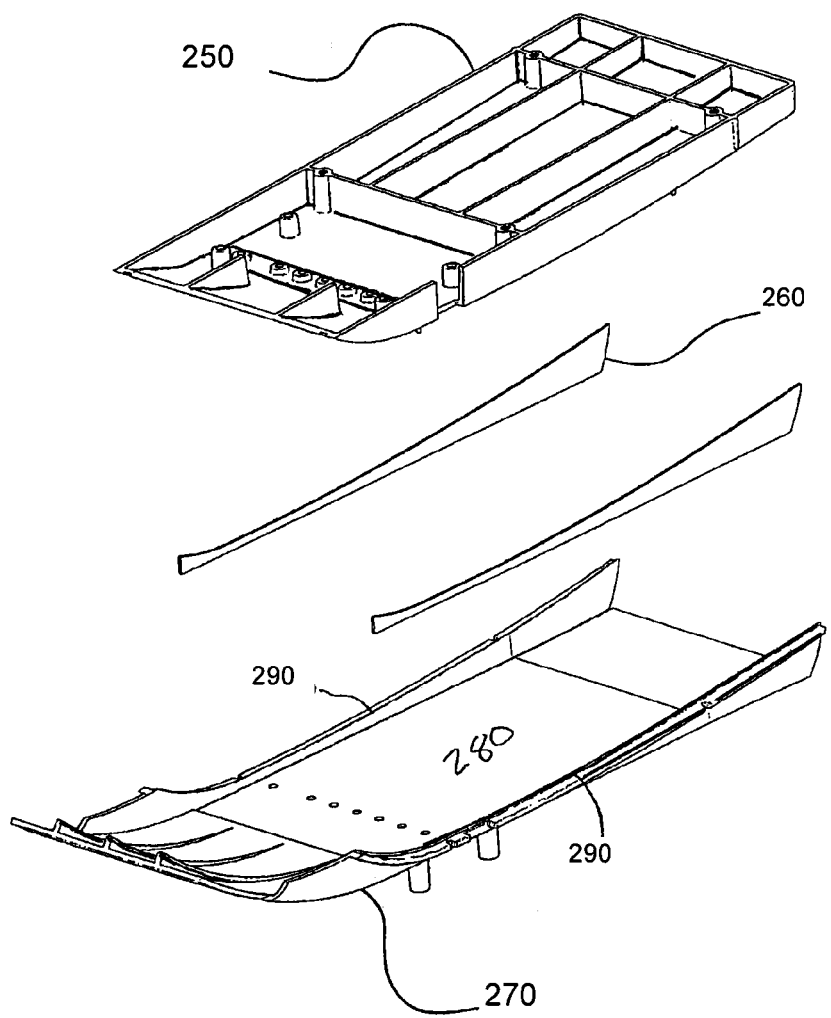
FIG. 6 illustrates an exploded assembly of the main components of a paper path assembly.

FIG. 6 illustrates an exploded assembly of the main components of the paper path assembly showing a paper guide trough 250, a paper guide platform 270 defining a guide channel 280 when assembled. FIG. 6 further illustrates spacer strips 260 for reconfiguring the guide channel 280 to accommodate different test sheet widths. The guide channel 280 has opposing integral sidewalls 290 for guiding a test sheet of a first width. The first width is a width of a standard paper size, or a fraction of the width of a standard paper size, such as one-half the width of a standard paper width. Spacer strips 260 are further illustrated that are configured to be received within recessed channels (See FIGS. 7 and 8) in the paper guide trough 250 and/or the guide platform 270. The spacer strips 260 are configured to reduce the width of the guide channel 280 thereby reconfiguring the guide channel 280 to receive, laterally constrain, and guide test sheets of a second width, the second width being less than the first width and being defined by a width of a different type of standard sized paper or a fraction of a width of a different standard sized paper.

For example, the first width can be the width of letter sized standard paper or a fraction of the width of a letter sized paper, such as one-half of the width of letter sized standard paper. The second width can be the width of A4 sized standard paper or a fraction of the width of A4 sized paper, such as one-half of the width of A4 standard sized paper. Thus, the width of the spacers 260 can accommodate the difference between width one and width two. For example, if two spacers 260 are used as illustrated in FIG. 6, the width of the spacers 260 are about one-half of the difference between width one and width two taking into consideration manufacturing tolerances.

The reproduced optical testing sheets can be a fraction of a single standard sized paper size such that they may be reproduced in multiples on a single standard sized sheet using a conventional printing device, such as a printer or photocopier, and cut to produce multiple testing sheets of the appropriate width. For example, a single test sheet may be one-half the width of a letter or A4 standard sheet width. In this instance two test sheets may be reproduced on a single standard sized letter or A4 sheet using a conventional printing and reproducing devices, and the reproduced sheet can be cut in half to produce two separate compatible test sheets. Thus a standard size sheet of paper can be divided into different fractional testing sheets and reproduced to produce multiple testing sheets per page. Any number of testing sheets having fractional widths and/or lengths can be made from a signal standard sized sheet.

Figure 7:
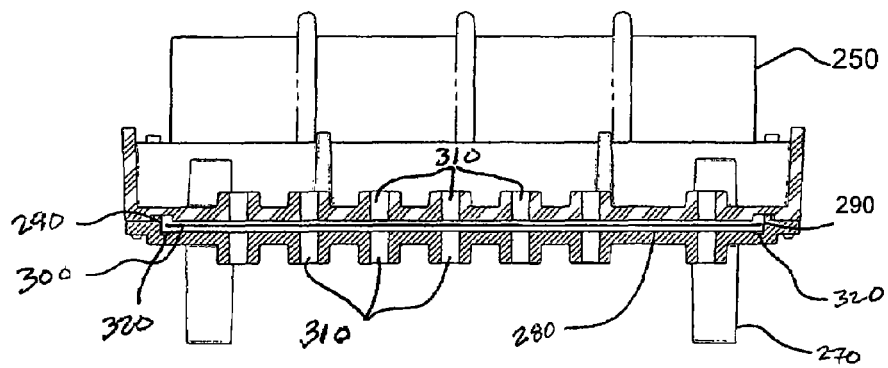
FIG. 7 illustrates a cross-sectional view of a means for accommodating different widths of standard sized paper or fractional widths of standard sized paper.

Referring to FIG. 7, a cross-sectional view of the means for accommodating different widths of standard sized paper or fractional widths of standard sized paper is illustrated without the spacer strips 260 installed. The assembly includes the paper guide trough 250 and the paper guide platform 270 fastened together to create a channel 280 to direct a paper test form 300 past a linear set of openings 310 in the paper guides to facilitate the alignment of predefined areas on the paper test form 300 to sensors and emitters inserted into these openings 310 on opposing sides of the channel 280. The paper guide trough 250 has an opposing set of integral perpendicular side walls 290 to constrain the paper test form 300 side-to-side as it passes through the channel 280. These side walls 290 terminate the main horizontal guide surface 280 in at least one recessed channel 320 to provide for receiving a spacer strip 260 (see FIGS. 6 and 8) to facilitate adjustment to the overall width of the channel 280 of the paper guide trough 250 to alternate different sized test forms 300

Figure 8:
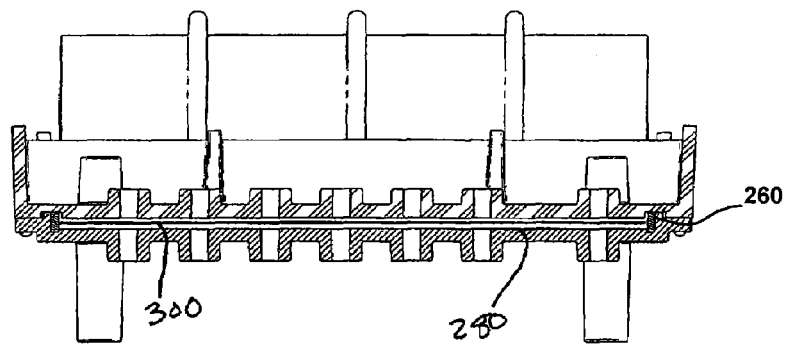
FIG. 8 illustrates a cross-sectional view of the assembly and a test sheet with the spacer strips installed thus accommodating a test sheet of a width less than the embodiment illustrated in FIG. 7.

FIG. 8 shows a cross-sectional view of the assembly and a test sheet 300 where the spacer strips 260 are installed thus accommodating a test sheet 300 of a width less than the embodiment illustrated in FIG. 7. The longitudinal edge of the spacer strip 260 sits below the main guide surface 280 to prevent the edge of the paper form 300 from catching in a butt joint between the paper guide trough 250 and the spacer strip 260.

The optical mark recognition tabulation device embodiments find applicability in many industries. For example, optical mark recognition tabulation devices are used for testing and surveys. Thus, the optical mark recognition tabulation device finds applicability in schools, training courses, governmental agencies, general workforce training and any other testing applications. Moreover, the embodiments discussed herein find applicability in inventory for tabulating and subsequent tracking of inventory. For example, inventory can be tracked in warehouses, restaurants, offices etc.

The embodiments disclosed herein can also be used for individual worker construction trade operations tracking. In the construction trade there is currently no good way to determine how many hours a worker, such as an electrician, plumber, etc., worked on a project and how much equipment he installed that day, such as light fixtures, feet of conduit etc. A test sheet can be generated that must be filled out at the end of each day by each worker with the answers (bubbles filled in) to the questions separate to, or printed on the test sheets, and including a location for each worker to sign the form. The test sheets and questions can be created by a foreman or other supervisor and printed using conventional printing device. Thus, this can create a solution to the problem that typically on a construction site there is no accountability of hours or material consumed on a daily or even weekly basis. The worker can use pencil or other marking instrument to fill out the form at the end of each day and the results are collected by one of the optical mark recognition tabulation device disclosed herein and used by an overall project tracking program which can include software executed on a computer that may be coupled to the optical mark recognition and tabulation device.

Thus, a method for individual worker construction trade operations tracking can include receiving data from an optical mark recognition tabulation device, such as those disclosed herein. The data describes work done and materials used by the worker. The method further includes tracking the worker's hours and materials used over a period of time. The method can further include tracking the worker's hours and materials used over a period of time along with hours and materials used by other workers. The optical mark recognition tabulation devices disclosed herein can also be used to track inventory. The methods can further include creation of customized testing forms using software and printing the testing forms on a printer. The customized testing forms are compatible with the optical mark recognition tabulation devices disclosed herein.

The data describing the signal received from the optical sensors can be communicated to a computer. The computer can be a conventional or special purpose computer. The computer can execute software embodied by computer executable instructions stored on a computer readable medium. The data received describing test sheet answers can be stored on computer readable media as data structures. For example the data structures can be stored as a chart, tabular, or spreadsheet data structure. The spreadsheet data structure can be a Microsoft Excel spreadsheet data file or any other common type of data structure for organizing data and associating the data with a test pupil, worker, or other person who made the entries to the test sheet.

Embodiments within the scope of embodiments illustrated herein can also include computer-readable media for carrying or having computer-executable instructions or data structures stored thereon. For example, embodiments disclosed herein include software configured to create customized compatible test sheets. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 9 and the following discussion are intended to provide a brief, general description of a suitable computing environment that can be coupled to the optical mark recognition tabulation devices to receive signals describing optical marks or used to create customized compatible testing sheets. Although not required, several embodiments will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the embodiments illustrated herein may be practiced in network computing environments with many types of computer system configurations, including personal computers, hand-held devices, multi-processor systems, microprocessor-based or programmable consumer electronics, network PCs, minicomputers, mainframe computers, and the like. Several embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices. Moreover, the optical mark recognition tabulation devices can be integrated with any, or all, of the components of a conventional or special purpose computer system.

With reference to FIG. 9, an exemplary system for implementing several embodiments includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 9. The logical connections depicted in FIG. 9 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary, and there are other means of establishing communications over wide area network 452.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical mark recognition tabulation device comprising:
    a guide channel including opposing integral sidewalls configured to laterally constrain a test sheet as the test sheet is fed past a set of optical sensors;
    the optical sensors being aligned with optical entry indicia on the test sheet to sense marks on the optical entry indicia as the test sheet is fed past the optical sensors;
    a recessed channel located along at least a substantial portion of a side of the guide channel; and
    a spacer strip configured to be received within the recessed channel, the spacer strip having a width that effectively reduces the width of the guide channel such that the guide channel is reconfigured to laterally constrain a different size of test sheet when the spacer strip is received within the recessed channel.

2. An optical mark recognition tabulation device according to claim 1, wherein the test sheet is fed by gravity.

3. An optical mark recognition tabulation device according to claim 2, wherein the guide channel defines a feed path that is substantially parallel to the force of gravity.

4. An optical mark recognition tabulation device according to claim 2, further comprising:
    a test sheet receptacle configured to receive test sheets from the guide channel.

5. An optical mark recognition tabulation device according to claim 4, wherein the test sheet receptacle is substantially perpendicular to the guide channel such that the test sheets are fed via gravity through the guide channel and into the test sheet receptacle through a substantially 90 degree turn.

6. An optical mark recognition tabulation device according to claim 4, wherein the guide channel and the test sheet receptacle are mechanically coupled by a pivot such that the angle between the guide channel and the test sheet receptacle can be varied between substantially perpendicular and substantially parallel.

7. An optical mark recognition tabulation device according to claim 1, wherein the guide channel is sized and configured to guide a test sheet that has a width that is a fraction of a standard letter sized sheet of paper when the spacer strip is not present in the recessed channel.

8. An optical mark recognition tabulation device according to claim 7, wherein the guide channel is sized and configured to guide a test sheet that has a width that is a fraction of a standard A4 sized sheet of paper when the spacer strip is present in the recessed channel.

9. An optical mark recognition tabulation device according to claim 1, wherein the spacer strip has a width that is a fraction of the difference between the width of a standard letter size sheet of paper and an A4 size sheet of paper.

10. An optical mark recognition tabulation device according to claim 9, wherein the fraction is ½.

11. An optical mark recognition tabulation device according to claim 1, wherein the spacer strip has a width that is about 0.23 inches or about 0.115 inches.

12. An optical mark recognition tabulation device according to claim 1, further comprising optical emitters optically coupled with the optical sensors.

13. An optical mark recognition tabulation device according to claim 12, wherein the optical emitters generate infrared electromagnetic radiation.

14. An optical mark recognition tabulation device according to claim 12, wherein the optical emitters are arranged opposite to the optical sensors and optically aligned with the optical sensors such that the optical emitters emit electromagnetic radiation through the test sheet when the test sheet is fed past the set of optical sensors thereby sensing marks on the test sheet.

15. An optical mark recognition tabulation device according to claim 1, further comprising an electrical port and circuitry, wherein the optical sensors are configured to detect optical marks on the test sheet and communicate electrical signals to the circuitry when the optical marks are detected, wherein the electrical circuitry is configured to communicate electrical signals to the port including data describing the optical marks detected by the optical sensors.

16. An optical mark recognition tabulation device according to claim 15, wherein the port includes a universal serial bus (USB) port and/or a serial port.

17. A system for tabulating optical entries to a test sheet comprising:
    an optical mark recognition tabulation device according to claim 15; and
    a computer coupled to the port, the computer configured to receive the data describing the optical marks detected by the optical sensors, the computer including computer readable media includes computer executable instructions stored on the computer readable media, the computer executable instructions causing the computer to perform the following acts when executed by the computer:
    store the data describing the optical marks as data structures in the computer readable medium.

18. A system according to claim 17, wherein the computer readable media further includes computer executable instructions causing the computer to perform the following acts when executed by the computer:
    organize the data structures into a spreadsheet data structure format.

* * * * *

UNITED STATES PATENT AND TRADEMARK OFFICE
CERTIFICATE OF CORRECTION

PATENT NO.       : 7,593,685 B1                                   Page 1 of 1
APPLICATION NO.  : 11/422426
DATED            : September 22, 2009
INVENTOR(S)      : Richard C. Hedderich It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 580 days.

Signed and Sealed this

Twenty-eighth Day of September, 2010

David J. Kappos
*Director of the United States Patent and Trademark Office*